US006835032B1

(12) United States Patent
Pozgay et al.

(10) Patent No.: US 6,835,032 B1
(45) Date of Patent: Dec. 28, 2004

(54) ROTARY POWER HAND TOOL HAVING A FLEXIBLE HANDLE AND ATTACHMENT SYSTEM

(75) Inventors: David Pozgay, Evanston, IL (US); Jonathan G. Riley, Chicago, IL (US); Dan Williams, Chicago, IL (US)

(73) Assignee: Credo Technology Corporation, Broadview, IL (US)

( * ) Notice: Subject to any disclaimer, the term of this patent is extended or adjusted under 35 U.S.C. 154(b) by 0 days.

(21) Appl. No.: 10/656,799

(22) Filed: Sep. 5, 2003

(51) Int. Cl.[7] .................................................. B23C 1/20

(52) U.S. Cl. ....................... 409/182; 409/181; 409/175; 144/136.95; 16/422

(58) Field of Search ................................. 409/182, 181, 409/175; 144/136.95, 154.5; 451/359, 357; 16/422, 430

(56) References Cited

U.S. PATENT DOCUMENTS

| | | | | | |
|---|---|---|---|---|---|
| 3,363,510 | A | * | 1/1968 | Burrows et al. | 409/182 |
| 3,466,973 | A | * | 9/1969 | Rees | 409/182 |
| 3,587,387 | A | * | 6/1971 | Burrows | 409/182 |
| 3,908,239 | A | * | 9/1975 | Gorman | 16/273 |
| 4,316,685 | A | * | 2/1982 | George | 409/182 |
| 4,938,642 | A | * | 7/1990 | Imahashi et al. | 409/182 |
| 5,913,645 | A | * | 6/1999 | Coffey | 409/182 |
| 6,065,912 | A | * | 5/2000 | Bosten et al. | 409/182 |
| 6,266,850 | B1 | * | 7/2001 | Williams et al. | 409/182 |
| 6,725,892 | B2 | * | 4/2004 | McDonald et al. | 409/182 |
| 6,754,935 | B2 | * | 6/2004 | Pozgay et al. | 409/182 |

FOREIGN PATENT DOCUMENTS

| | | | | | |
|---|---|---|---|---|---|
| DE | 4119325 | A | * | 12/1992 | B24B/23/02 |
| DE | 20318570 | U1 | * | 6/2004 | B25C/1/00 |

* cited by examiner

*Primary Examiner*—A. L. Wellington
*Assistant Examiner*—Dana Ross
(74) *Attorney, Agent, or Firm*—Greer, Burns & Crain, Ltd.

(57) ABSTRACT

A preferred embodiment of the present invention is directed to a detachable flexible handle for a power hand tool and an attachment system associated with the handle and the tool for releasably attaching either a rigid or the flexible handle to the power hand tool. The system has housing attachment recesses on the tool that receive attachment clips located at opposite end portions of the flexible handle or structure of a rigid handle.

15 Claims, 3 Drawing Sheets

ROTARY POWER HAND TOOL HAVING A FLEXIBLE HANDLE AND ATTACHMENT SYSTEM

FIELD OF THE INVENTION

The present invention is related to power hand tools. More particularly, the present invention is related to handles for power hand tools and a releasable attachment system for coupling the handles to the housing of the hand tool.

BACKGROUND OF THE INVENTION

Most power hand tools have handles of one form or another to facilitate their use. Exceptions to this may be found in power hand tools that are small enough for the user to conveniently hold them in one hand. When they are slightly larger, some power tools have handles that are detachable so that the user can choose whether a handle is convenient or not and either remove or attach it. The use of a handle may be desirable on power hand tools that are known in the building trade as spiral saws, i.e., cylindrical units that use a bit that closely resembles a drill bit, but which has cutting surfaces on the sides of the bit for cutting holes in dry wall for example. A detachable handle may be desirable for use with such spiral saws so that a user can comfortably hold the tool in different positions. Also, since such hand tools may require significant force to move it about during cutting of certain materials such as drywall. In those circumstances, two handed operation whereby the user directly grips the tool housing may be most convenient. It may be inconvenient, however, to grip the tool housing directly or to use two hands when using the tool to operate in other positions. When using the tool to cut into an overhead surface, for example, it may be useful to have a handle attached to the tool for gripping. The provision of a detachable handle is advantageous in that a user may have the option of holding the tool directly by its housing or by the handle.

It is also desirable for such detachable handles to be easily attached and removed without the use of separate tools. At least one power rotary cutting hand tool has a rigid handle that has an attachment mechanism that engages a pair of recesses in the housing of the tool to firmly hold the tool and yet can be easily removed. That structure is disclosed in U.S. Patent (Ser. No. 10/161,944) entitled POWER TOOL HANDLE and assigned to the Robert Bosch Tool Corporation of Broadview Ill. While artisans may prefer not to have a rigid handle on the tool during some uses, it may be convenient and desirable to have a flexible handle attached to the tool during some operations and/or for carrying the tool between operations.

SUMMARY OF THE INVENTION

A preferred embodiment of the present invention is directed to a rotary hand tool having a flexible handle and an attachment system associated with the handle and the tool that enables easy attachment and removal of the flexible handle. The system has housing attachment recesses on the tool that receive attachment clips located at opposite end portions of the flexible handle. The attachment recesses are compatible for attaching a generally C-shaped detachable rigid handle which has opposite end portions with a gripping portion therebetween. The rigid handle has a release lever in one end portion and a fixed attachment arm on the other end portion for engaging the spaced apart attachment recesses of the tool housing.

DETAILED DESCRIPTION

Figure 1:
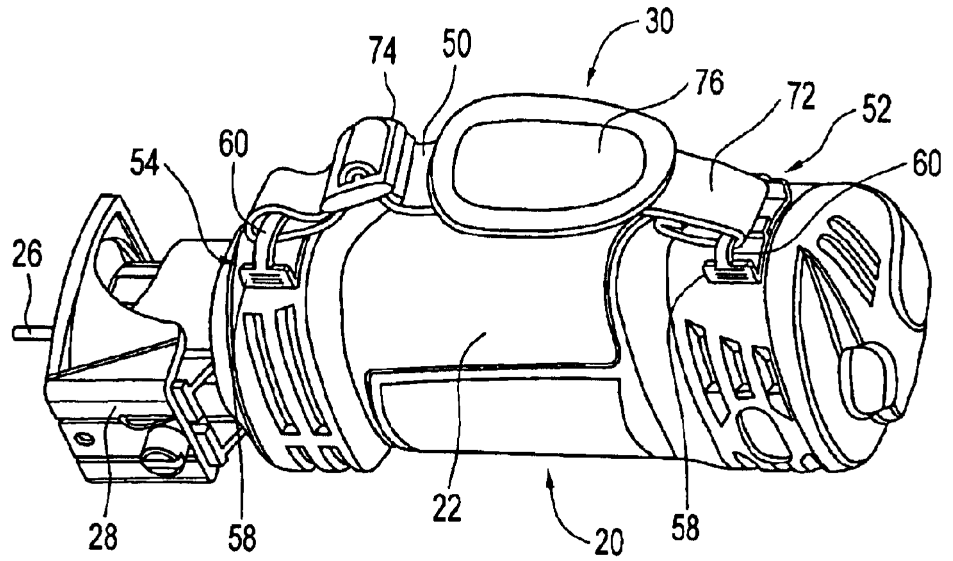
FIG. 1 is a perspective view of a preferred embodiment of a power hand tool having a flexible handle attached thereto.

A preferred embodiment of the rotary power hand tool of the present invention is shown in the drawings. While the preferred embodiment is shown in connection with a rotary power hand tool that is generally cylindrical in overall shape and is relatively small so that an artisan can operate the hand tool with one or both hands without a handle or it may have a detachable rigid handle provided with the tool. If the rigid handle is removed from the body of the tool, the user must affirmatively grasp the body of the tool during use and while carrying it. If there is no convenient place for an artisan to put the tool down between operations, it may be convenient for the tool to have a flexible handle or longer strap so that the user could use to easily hang the tool on his hand or arm at least temporarily without consciously gripping the tool. The preferred embodiment of the present invention facilitates various handle configurations so that the user can choose between the various configurations as he sees fit.

Figure 2:
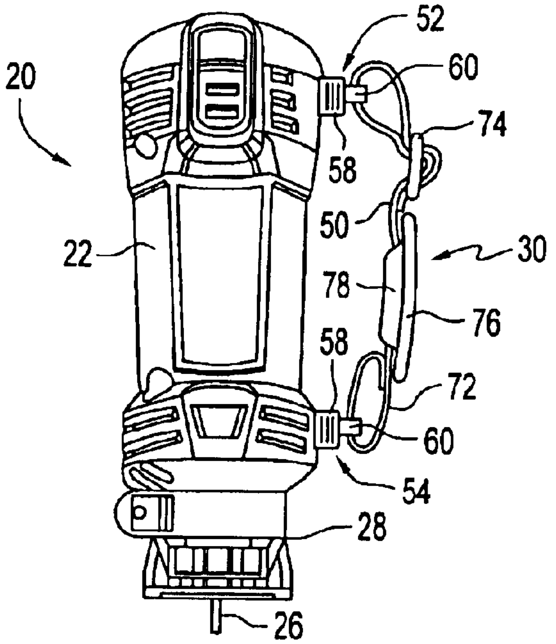
FIG. 2 is a plan view of the embodiment shown in FIG. 1.
Figure 3:
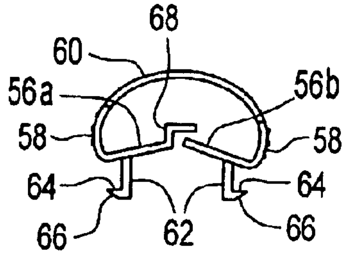
FIG. 3 is a front view of an attachment clip of the flexible handle shown in FIGS. 1 and 2.
Figure 4:
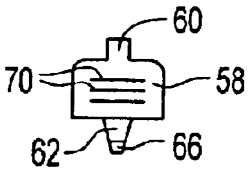
FIG. 4 is a side view of the attachment clip shown in FIG. 3.
Figure 5:
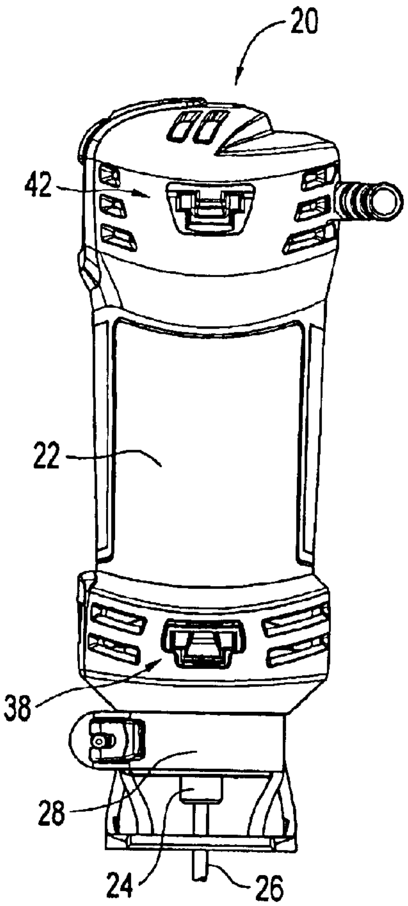
FIG. 5 is a side view of the embodiment shown in FIG. 1 and particularly illustrating the attachment recesses thereof.
Figure 9:
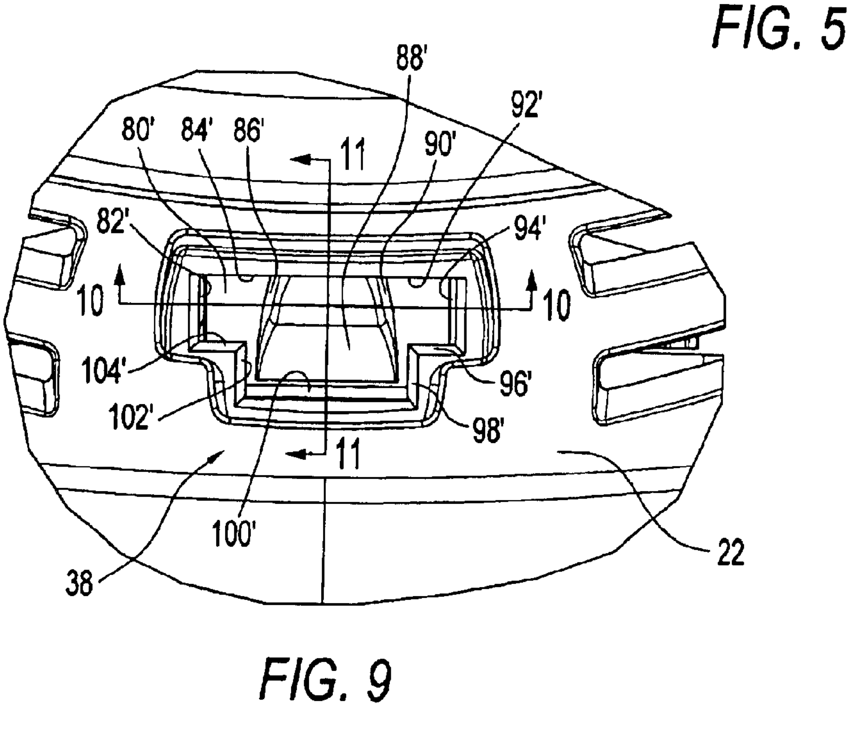
FIG. 9 is a plan view of the other of the attachment recesses shown in FIG. 5.

Turning now to the drawings, and particularly FIGS. 1 and 2, a tool indicated generally at 20, is shown to have a generally cylindrical elongated housing 22 in which a motor is located. It has a rotatable output shaft 24 (see FIG. 5) to which a cutting bit 26 or other tool is attached. An adjustable depth guide 28 may be provided that fits on the nose of the tool for controlling the depth of cut of the bit 26. A common use of this type of tool is to cut openings in drywall for light fixtures, switch boxes and electrical outlets and the like with the bit 26 being a spiral side cutting bit.

Figure 12:
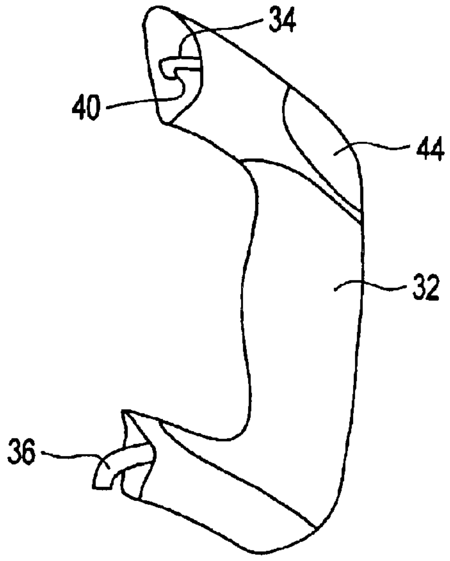
FIG. 12 is a side view of a rigid handle shown with portions removed to illustrate the manner in which the rigid handle is attachable to the power hand tool.

In accordance with the preferred embodiment of the present invention, a flexible handle, indicated generally at 30, is provided and can be attached to the housing at approximately the same locations as a rigid handle 32 shown in FIG. 12 can be attached. The rigid handle has a pivotable lever 34 at the upper end thereof and an attachment arm 36 at the bottom end thereof. The attachment arm 36 is curved downwardly to engage a flange in an attachment recess, indicated generally at 38 in FIG. 5, and the lever 34 has a hook 40 that engages a similar flange to be described that is located at an upper attachment recess, indicated generally at 42 in FIG. 5. The lever 34 can be manipulated by raising a cover 44 that reveals a thumb engaging surface (not shown) which when depressed, causes the lever 34 to be moved upwardly to disengage from a shelf (to be described later) enabling the handle 32 to be removed from the tool 20.

Returning to FIGS. 1 and 2, the flexible handle 30 comprises a long thin strap 50 that is attached to attachment clips 52 on opposite end portions thereof. The width of the strap 50 is approximately ¾ of an inch, but can be wider or narrower as desired. The strap is preferably made of a woven fabric that is strong and durable and which preferably does not absorb moisture and may be made of a synthetic material such as nylon or the like. Each of the attachment clips 52 and 54 are substantially identical in construction and comprise split base portions 56*a* and 56*b* so as to define a gap that facilitates removal of the clip from the housing when desired. Each of the base portions 56*a* and 56*b* merge into a generally transverse side portion 58 with a bridge portion 60 extending between the side portions. A pair of spaced apart prongs 62 extend downwardly from the base portion and each prong has a transverse leg 64, with the transverse legs pointing away from each other and having a beveled surface 66 that tends to deflect the prongs toward each other when the beveled surface 66 engage surfaces of the housing when the attachment clips are inserted into the recesses 38 or 42.

While the bridge portion 60 is narrower than the side portions 58, it has a sufficient cross sectional area so that it is relatively strong and provide the necessary biasing force to keep the prongs 62 biased away from each other to maintain engagement with complimentary structure of the recesses 38 and 42. In this regard, the attachment clips are preferably formed as an integral one piece unit and made of a resilient material that has sufficient strength to support the tool when held by the strap 30 and sufficient strength to keep the prongs in locking engagement with the housing.

One of the base segments, e.g., 56*a*, preferably has an L-shaped extension 68 that limits the amount of movement of the sides 58 toward one another when the user squeezes the sides together. To facilitate gripping, a number of raised ribs 70 may be provided on the outer surface of each of the sides 58.

Referring again to FIGS. 1 and 2, the strap 50 includes a lower end portion 72 that loops around the bridge portion 60 and the two layers of the strap in this area are preferably sewn, riveted or otherwise attached together. At the opposite end portion, the strap 50 extends through a buckle 74, is looped around the bridge portion 60 of the clip 54 and extended back through the buckle 74 as shown. The strap 50 may therefore be adjusted within the buckle 74 to vary the effective length of the handle 30. The strap 50 also has a pad portion 76 secured to it, with the strap 50 extending through an opening in a bottom portion 78 of the pad 76.

Figure 6:
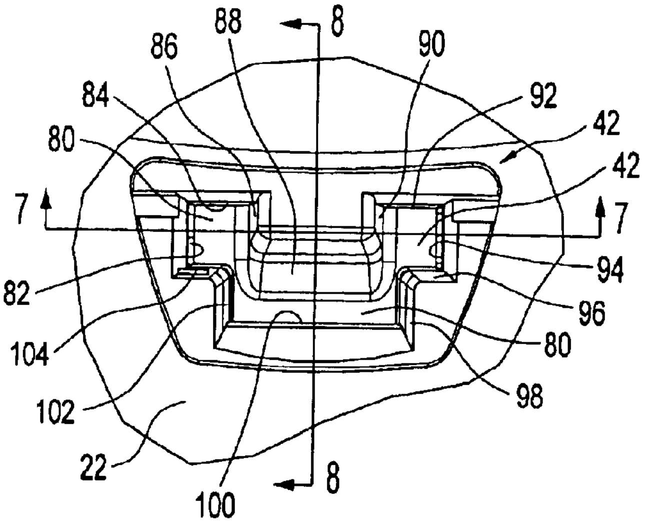
FIG. 6 is an enlarged view of one of the attachment recesses of the embodiment shown in FIG. 5.
Figure 7:
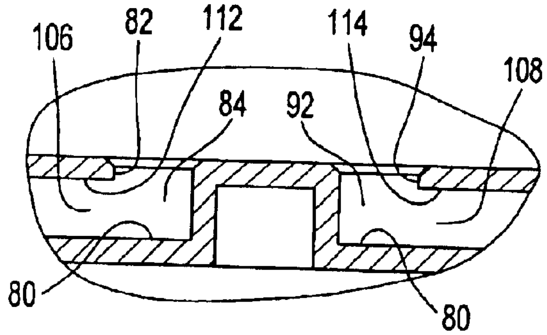
FIG. 7 is a cross-section taken generally along the line 7—7 in FIG. 6.
Figure 8:
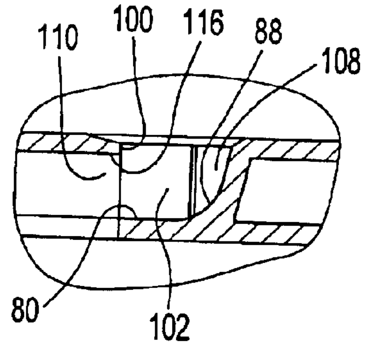
FIG. 8 is a cross-section taken generally along the line 8—8 of FIG. 6.
Figure 10:
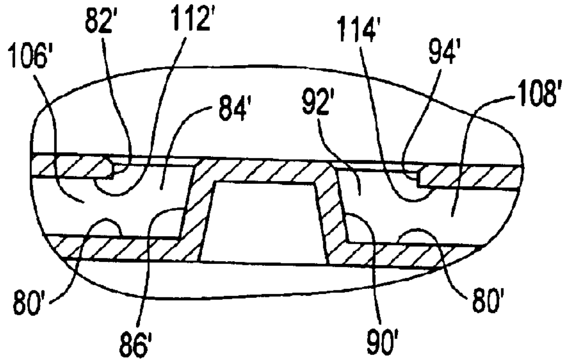
FIG. 10 is a cross-section taken generally along the line 10—10 of FIG. 9.
Figure 11:
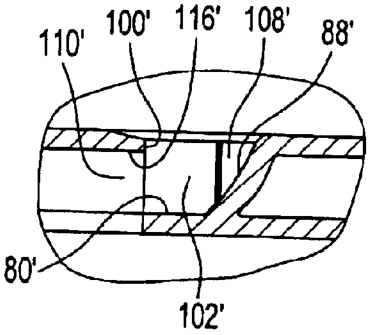
FIG. 11 is a cross-section taken generally along the line 11—11 of FIG. 9.

Turning now to the upper attachment recess 42 and referring to FIGS. 6, 7 and 8, the recess 42 has a bottom surface 80, as well as a number of walls 82, 84, 86, 88, 90, 92, 94, 96, 98, 100, 102 and 104, which extend from the bottom surface 80 to the outer surface of the housing 22. While there are a number of decorative bevels at the interface between the outer surface and the walls, the walls are generally perpendicular to the plane of the bottom surface 80, except for the surface 88, which as shown in FIG. 8, has a significant curvature. As can be seen from the cross-sections of FIGS. 7 and 8, the walls 82, 94 and 100 have openings 106, 108 and 110 formed therein, respectively, which respectively form shelves 112, 114 and 116 for engagement with the handles 30 or 32. In this regard, walls 82 and 94 are spaced apart from one another and are opposed to each other and are spaced a distance that is slightly less than the distance between the prongs 62 of the attachment clips 52 so that the transverse legs 64 will engage the shelves 112 and 114 to hold the clip 52 in place. If the flexible handle is removed and the rigid handle 32 attached, the edge 40 of the lever 34 will engage the shelf 116 when it is attached to the housing 22.

With regard to the attachment recess 38, it is very similar in its construction and the same reference numbers with a prime designation have been given to similar features of it. It should be understood that the arm 36 of the rigid handle 32 engages the shelf 106' when the rigid handle is attached to the tool 20.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A rotary power hand tool comprising:

a housing having an outer surface and a motor therein and having at least two attachment recesses spaced from one another in said outer surface of said housing;

a flexible handle having an elongated flexible intermediate portion extending between opposite end portions, each end portion having an attachment clip connected thereto, said attachment clips being configured to fit within said attachment recesses to attach said handle to said housing;

wherein at least one of said recesses has a bottom surface and at least spaced apart opposing walls extending from said bottom surface to said outer surface, each of said opposing walls having an opening therein below said outer surface and defining a shelf beneath said outer surface for engaging one of said attachment clips.

2. A rotary power hand tool as defined by claim 1 wherein said intermediate portion comprises a thin flexible strap of material.

3. A rotary power hand tool as defined by claim 2 wherein said thin flexible strap of material is a woven fabric.

4. A rotary power hand tool as defined by claim 1 wherein each of said attachment clips comprises:

a generally flat base portion;

two side portions extending generally transversely from said base portion, the distance between said side portions being approximately the width of said intermediate portion a bridge portion extending between said side portions and defining a support member for connecting said attachment clip to said intermediate portion;

and a pair of spaced apart prongs extending transversely in a direction opposite said side portions, each of said prongs having a transverse leg near the ends of each of said prongs and extending in opposite directions relative to each other, said prongs being sufficiently spaced and made of resilient material so that when each said clip is inserted into said attachment recess, said transverse legs engage said shelves and retain said clip in said recess.

5. A rotary power hand tool as defined by claim 4 wherein said clips are made of a strong resilient plastic material.

6. A rotary power hand tool as defined by claim 4 wherein said base has a discontinuity between said prongs, thereby enabling said prongs to be moved toward one another when said sides are pressed together, to thereby disengage said legs from said shelves so that said clip can be removed from said attachment recess.

7. A rotary power hand tool as defined by claim 2 further comprising an enlarged pad attached to said intermediate portion.

8. A rotary power hand tool as defined by claim 1 wherein said recess further comprises a third wall between said opposing walls, said third wall having an opening therein below said outer surface defining a shelf beneath said surface for engaging an attaching mechanism of a removable rigid handle.

9. A rotary power hand tool as defined by claim 7 wherein at least one end portion of said flexible handle comprises an adjustment buckle for varying the length of said intermediate portion.

10. A rotary hand tool comprising:

a housing having an outer surface and at least two attachment recesses spaced from one another in said outer surface of said housing, each of said recesses having a bottom surface and generally perpendicular walls, said walls having multiple openings below said outer surface of said housing, each opening defining a retaining shelf, two of said shelves being spaced apart and opposite one another and configured to retain one of said attachment clips, and a third shelf being configured to retain a rigid handle attachment mechanism; and a flexible handle comprising an elongated flexible flat strap, each end portion of which is connected to an attachment clip, said attachment clips being configured to fit within said attachment recesses and engage said two opposed shelves to attach said handle to said housing.

11. A rotary power hand tool as defined in claim 10 wherein said third shelf is located between said two shelves.

12. In a rotary hand tool of the type which has a housing having an outer surface and at least two attachment recesses spaced from one another and located in the outer surface of the housing, each of the recesses having a bottom surface and generally perpendicular walls, and an opening in one of the walls below the outer surface of the housing to define a shelf configured to retain an end of a rigid handle, the improvement comprising:

each of the recesses having two other walls with openings below the outer surface of the housing, each opening defining a clip retaining shelf, the two clip retaining shelves being spaced apart and opposite one another and configured to retain an attachment clip; and a flexible handle comprising an elongated flexible flat strap, each end portion of which has an attachment clip connected thereto, said attachment clips being configured to fit within the attachment recesses and engage said clip retaining shelves to attach said flexible handle to said housing.

13. The rotary hand tool as defined in claim 12 wherein each of said attachment clips comprises:

generally flat base portion;

two side portions extending generally transversely from said base portion, the distance between said side portions being approximately the width of an intermediate portion of said flexible handle;

a bridge portion extending between said side portions and defining a support member for connecting said attachment clip to said intermediate portion; and pair of spaced apart prongs extending transversely in a direction opposite said side portions, each of said prongs having a transverse leg near the ends of each of said prongs and extending in opposite directions relative to each other, said prongs being sufficiently spaced and made of resilient material so that when each said clip is inserted into said attachment recess, said transverse legs engage said shelves and retain said clip in said recess.

14. A rotary power hand tool as defined by claim 13 wherein said clips are made of a strong resilient plastic material.

15. A rotary power hand tool as defined by claim 13 wherein said base has a discontinuity between said prongs, thereby enabling said prongs to be moved toward one another when said sides are pressed together, to thereby disengage said legs from said shelves so that said clip can be removed from said attachment recess.

* * * * *